(12) United States Patent
Radue et al.

(10) Patent No.: US 12,448,926 B2
(45) Date of Patent: Oct. 21, 2025

(54) THROTTLE DRIVE ACTUATOR FOR AN ENGINE

(71) Applicant: Kohler Co., Kohler, WI (US)

(72) Inventors: Martin L. Radue, Plymouth, WI (US); William D. Koenigs, Fond du Lac, WI (US)

(73) Assignee: Discovery Energy, LLC, Kohler, WI (US)

( * ) Notice: Subject to any disclaimer, the term of this patent is extended or adjusted under 35 U.S.C. 154(b) by 446 days.

(21) Appl. No.: 17/861,663

(22) Filed: Jul. 11, 2022

(65) Prior Publication Data

US 2022/0341363 A1  Oct. 27, 2022

Related U.S. Application Data

(63) Continuation of application No. 17/022,999, filed on Sep. 16, 2020, now Pat. No. 11,408,358, which is a continuation of application No. 15/650,700, filed on Jul. 14, 2017, now Pat. No. 10,815,908, which is a continuation-in-part of application No. 14/876,166, filed on Oct. 6, 2015, now Pat. No. 9,739,218.

(51) Int. Cl.
| | |
|---|---|
| *F02D 9/10* | (2006.01) |
| *F02D 9/02* | (2006.01) |
| *F02D 11/10* | (2006.01) |
| *F02D 41/00* | (2006.01) |
| *F02M 35/10* | (2006.01) |
| *H02K 41/035* | (2006.01) |

(52) U.S. Cl.
CPC ............ *F02D 9/1065* (2013.01); *F02D 9/02* (2013.01); *F02D 11/10* (2013.01); *F02D 41/0002* (2013.01); *F02M 35/10249* (2013.01); *F02M 35/10255* (2013.01); *H02K 41/0358* (2013.01); *F02D 2011/102* (2013.01); *Y02T 10/40* (2013.01)

(58) Field of Classification Search
CPC .......... F02D 9/1065; F02D 9/02; F02D 11/10; F02D 41/0002; F02D 2011/102; F02M 35/10249; F02M 35/10255; H02K 41/0358; Y02T 10/40
USPC ....................................................... 123/399
See application file for complete search history.

(56) References Cited

U.S. PATENT DOCUMENTS

| | | |
|---|---|---|
| 914,094 A | 3/1909 | Whalen et al. |
| 3,459,976 A | 8/1969 | Nyman |
| 3,593,238 A | 7/1971 | Mori |
| 3,628,073 A | 12/1971 | Bemey |
| 4,181,288 A | 1/1980 | Bylsma |
| 4,345,228 A | 8/1982 | Idogaki et al. |

(Continued)

FOREIGN PATENT DOCUMENTS

EP       0154036 A2    9/1985

OTHER PUBLICATIONS

European Search Report for EP 16 18 9895 dated Feb. 10, 2017, 9 pages.

(Continued)

*Primary Examiner* — Logan M Kraft
*Assistant Examiner* — Anthony Donald Taylor, Jr.
(74) *Attorney, Agent, or Firm* — The Belles Group, P.C.

(57) ABSTRACT

A throttle drive actuator for an engine includes a rotor and a stator. The rotor connects with a valve of a throttle body to rotate the valve, to open a close an air passage of the throttle body of the engine.

18 Claims, 7 Drawing Sheets

(56) References Cited

U.S. PATENT DOCUMENTS

| | | | |
|---|---|---|---|
| 4,392,375 | A | 7/1983 | Eguchi et al. |
| 4,409,940 | A | 10/1983 | Gaus |
| 4,519,360 | A | 5/1985 | Murakami |
| 4,546,338 | A | 10/1985 | Idogaki et al. |
| 4,601,271 | A * | 7/1986 | Ejiri ............... F02D 11/10 123/399 |
| 4,639,624 | A | 1/1987 | Ejiri et al. |
| 4,651,041 | A * | 3/1987 | Shiraki ............ F02D 11/10 261/DIG. 74 |
| 4,698,535 | A * | 10/1987 | Shiraki ............ H02K 1/2796 310/156.37 |
| 4,735,183 | A | 4/1988 | Inoue et al. |
| 4,850,322 | A | 7/1989 | Uthoff et al. |
| 4,944,269 | A | 7/1990 | Imoehl |
| 4,976,237 | A | 12/1990 | Bollinger |
| 5,080,065 | A | 1/1992 | Nomura et al. |
| 5,168,184 | A | 12/1992 | Umehara et al. |
| RE34,302 | E | 7/1993 | Imoehl |
| 5,287,835 | A | 2/1994 | Fiorenza, II et al. |
| 5,606,950 | A | 3/1997 | Fujiwara et al. |
| 5,619,112 | A | 4/1997 | Younessi et al. |
| 5,624,100 | A | 4/1997 | Bolte et al. |
| 5,738,072 | A | 4/1998 | Bolte et al. |
| 5,823,165 | A | 10/1998 | Sato et al. |
| 5,996,554 | A | 12/1999 | Tojo et al. |
| 5,998,892 | A | 12/1999 | Smith et al. |
| 6,020,804 | A | 2/2000 | Gandel |
| 6,067,961 | A | 5/2000 | Kato |
| 6,109,589 | A | 8/2000 | Ackermann |
| 6,116,215 | A | 9/2000 | Soleanicov et al. |
| 6,215,207 | B1 | 4/2001 | Kondo et al. |
| 6,247,447 | B1 | 6/2001 | Muraji |
| 6,299,129 | B1 | 10/2001 | Suzuki et al. |
| 6,320,285 | B1 | 11/2001 | Ito et al. |
| 6,332,451 | B1 | 12/2001 | Sato et al. |
| 6,516,776 | B1 | 2/2003 | Kai et al. |
| 6,541,881 | B1 | 4/2003 | Turner |
| 6,729,299 | B2 | 5/2004 | Anschicks |
| 6,874,468 | B2 | 4/2005 | Watanabe |
| 7,028,979 | B2 | 4/2006 | Fauni |
| 7,100,568 | B2 | 9/2006 | Bornmann |
| 7,104,254 | B2 | 9/2006 | Arai et al. |
| 7,137,614 | B2 | 11/2006 | Masui et al. |
| 7,284,535 | B2 | 10/2007 | Irihune et al. |
| 7,458,360 | B2 | 12/2008 | Irihune et al. |
| 7,591,245 | B2 | 9/2009 | Baasch |
| 7,946,555 | B2 | 5/2011 | Ikeda |
| 7,950,623 | B2 | 5/2011 | Sasaki et al. |
| 7,958,865 | B2 | 6/2011 | Ichikawa et al. |
| 8,257,226 | B2 | 9/2012 | Reynolds |
| 8,763,985 | B2 | 7/2014 | Miki et al. |
| 9,739,218 | B2 | 8/2017 | Radue et al. |
| 10,815,908 | B2 | 10/2020 | Radue et al. |
| 2004/0025949 | A1 | 2/2004 | Wygnaski |
| 2004/0154589 | A1 | 8/2004 | Wayama et al. |
| 2005/0109970 | A1 | 5/2005 | Masui et al. |
| 2006/0016427 | A1 * | 1/2006 | Uda ............... F02D 11/106 123/399 |
| 2006/0038456 | A1 | 2/2006 | Bojiuc |
| 2006/0181171 | A1 | 8/2006 | Zhao |
| 2007/0157902 | A1 | 7/2007 | Possehl et al. |
| 2008/0224553 | A1 | 9/2008 | Abe et al. |
| 2010/0126299 | A1 | 5/2010 | Baldassari et al. |
| 2011/0140554 | A1 | 6/2011 | Wong et al. |
| 2013/0255432 | A1 | 10/2013 | Nomura et al. |
| 2016/0190756 | A1 | 6/2016 | Froebel et al. |
| 2017/0328285 | A1 | 11/2017 | Yoshikawa et al. |
| 2020/0408157 | A1 | 12/2020 | Radue et al. |

OTHER PUBLICATIONS

European Office Action for European Patent Application No. EP 16 189 895.2-1007 dated Mar. 27, 2018, 4 pages.

Chinese Office Action for Chinese Patent Application No. 201610859921.2 dated Jul. 26, 2019, 6 pages.

English summary of Chinese Office Action for Chinese Patent Application No. 201610859921.2 dated Jul. 26, 2019, 1 page.

* cited by examiner

THROTTLE DRIVE ACTUATOR FOR AN ENGINE

CROSS REFERENCE TO PRIOR APPLICATIONS

This application is a continuation of U.S. patent application Ser. No. 17/022,999, filed Sep. 16, 2020, which is a continuation of U.S. patent application Ser. No. 15/650,700, filed Jul. 14, 2017 (now U.S. Pat. No. 10,815,908), which is a continuation in part of U.S. patent application Ser. No. 14/876,166, filed Oct. 6, 2015 (now U.S. Pat. No. 9,739,218), hereby incorporated by reference in their entireties.

FIELD

The systems and methods relate to engines, and more particularly to a throttle drive actuator for a throttle body.

BACKGROUND

A motor can be used to control the tilt of a throttle valve for use in internal combustion engines. The motor can make adjustments of the throttle valve in response to the operation of the accelerator and varying operating conditions of the engine.

SUMMARY

According to one aspect, a throttle drive actuator for an engine includes a rotor and a stator. The rotor includes a north pole and a south pole. The rotor connects with a valve of a throttle body. The stator is positioned adjacent the rotor, and is configured to provide a magnetic field to rotate the rotor to open a close an air passage of the throttle body of the engine.

Other systems, methods, features, and advantages will be or will become apparent upon examination of the following figures and detailed description. It is intended that all such additional systems, methods, features, and advantages be included within this description and be protected by the accompanying claims.

BRIEF DESCRIPTION OF THE DRAWINGS

In association with the following detailed description, reference is made to the accompanying drawings, where like numerals in different figures can refer to the same element.

DETAILED DESCRIPTION

Figure 1:
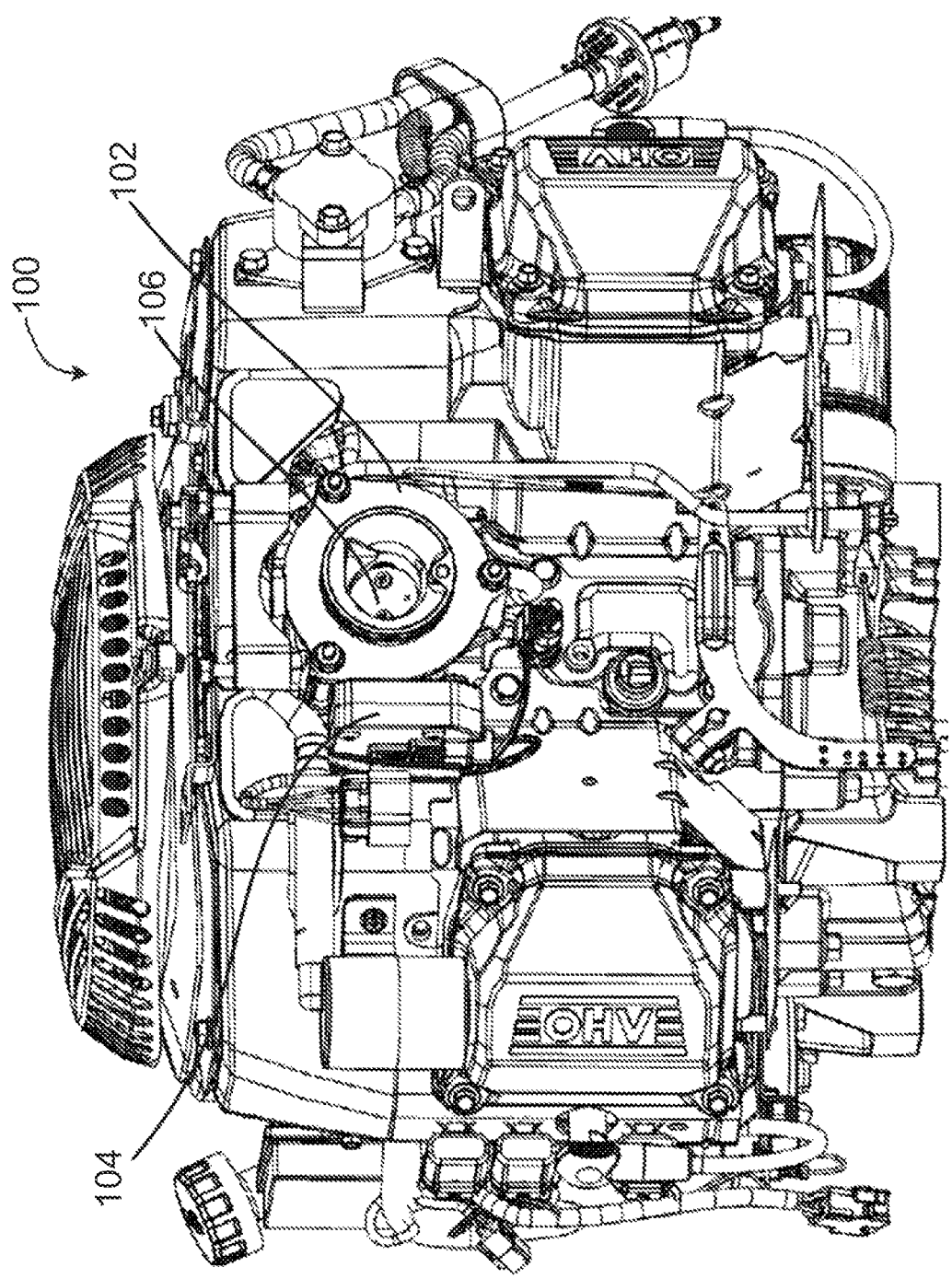
FIG. 1 is a schematic of an example engine including a throttle body.

While the disclosure may be susceptible to embodiments in different forms, there is illustrated in the drawings, and herein described in detail, one or more embodiments with the understanding that the present disclosure is to be considered an exemplification of the principles of the disclosure, and is not intended to limit the disclosure to that as illustrated and described herein. Therefore, unless otherwise noted, features disclosed herein may be combined together to form additional combinations that were not otherwise shown for purposes of brevity. It will be further appreciated that in some embodiments, one or more elements illustrated by way of example in a drawings may be eliminated and/or substituted with alternative elements within the scope of the disclosure.

FIG. 1 is a schematic of an example engine 100 including a throttle body 102 to control the amount of air into the engine 100. The engine 100 can be used in various implementations, including but not limited to mowers, utility equipment, recreational equipment, generators, welders, etc. A throttle drive actuator 104 is connected with the throttle body 102 to rotate a valve 106 of the throttle body 102. The valve 106 opens and closes to allow more or less air through the throttle body 102, e.g., in response to the operation of an accelerator and varying operating conditions of the engine 100.

The throttle drive actuator 104 can control the tilt of the valve 106. As described in more detail below, the throttle drive actuator 104 includes a field magnet having at least one pair of N and S poles and an armature having at least one set of coils disposed in face-to-face confronting relation to the magnet. The throttle drive actuator 104 can be coupled directly to a shaft carrying the throttle valve 106, the actuator 104 being urged by a spring toward a position where the valve 106 throttles off the passage of air. The coils of the throttle drive actuator 104 are positioned relative to the N and S poles of the magnet such that when the coil is excited any conductor portions can act effectively to develop torque to rotate the valve 106.

Figure 2:
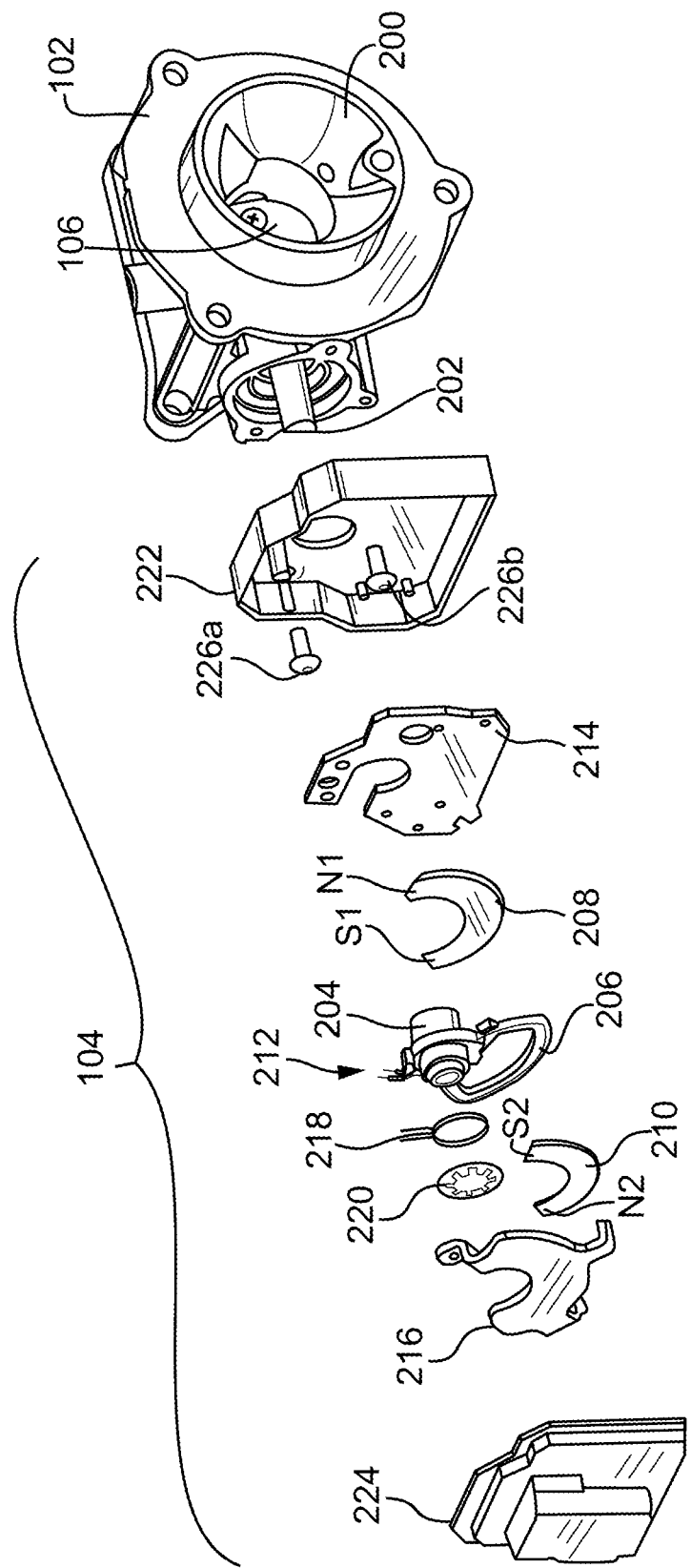
FIG. 2 is an exploded view of the example drive actuator that connects with the throttle body.

FIG. 2 is an exploded view of the example throttle drive actuator 104 that connects with the throttle body 102. The throttle body 102 has a cylindrical air passage 200 formed there through. In the air passage 200 the throttle valve 106 is supported by a rotary shaft 202. The throttle valve 106 can form a circular disk which closes the passage 200 or throttles the air flowing there through. Other shapes can be used. The rotary shaft 202 extends perpendicular to the central axis of the air passage and connect with the throttle drive actuator 104. The throttle valve 106 supported by the shaft 202 is placed under the influence of the drive actuator 104 which acts on the shaft 202 in such a way that the throttle valve 106 may be tilted to open and close the air passage 200. In operation, the throttle valve 106 is driven to rotate by the drive actuator 104 which is described in detail below, by way of the shaft 202, in such a way as to adjust the tilt of the valve for adjusting the opening of the air passage 200, hence the flow of air passing there through.

The rotary shaft 202 is secured to the throttle valve 106 at its diametral bisector line of the circular disk of the valve so that the shaft 202 is rotated integrally with the valve 106. The shaft 202 is attached at its opposite end to a coupler 204 of the rotary armature 206, or any suitable bearing means, in the throttle body 104. An armature 206 is positioned between opposing stationary magnet 208 having N1 and S1 poles and stationary magnet 210 having N2 and S2 poles in the opposite direction of magnet 208. For example, to create a magnetic field there between, pole N1 of magnet 208 opposes pole S2 of magnet 210, and pole S1 of magnet 208 opposes pole N2 of magnet 210, as described in more detail below. The magnet 208 may be mounted on a plate 214 and the magnet 210 may be mounted on a plate 216. In other implementations, the armature 206 may be stationary and the magnets 208 and/or 210 moved.

The coil of the armature 206 includes current carrying windings fed by wires 212 to induce a magnetic force which interacts with the magnet field created by magnets 208 and 210 to move the armature 206 which in turn rotates the shaft 202 to move the throttle valve 106 between open and closed positions. In other implementations, the armature 206 can include one or more magnets. The armature 206, the magnet 208, the magnet 210, etc. can all be enclosed in first housing portion 222 and an opposing second housing portion 224 to form a housing for the drive actuator 104. The first housing portion 222 can be removably attached to the throttle body 102 using fasteners 226a, 226b, e.g., screws or other fasteners. In this way the drive actuator 104 can be part of the original assembly with the throttle body 102, retrofitted to an existing throttle body 102 and/or replace a damaged drive actuator, etc.

Figure 3:
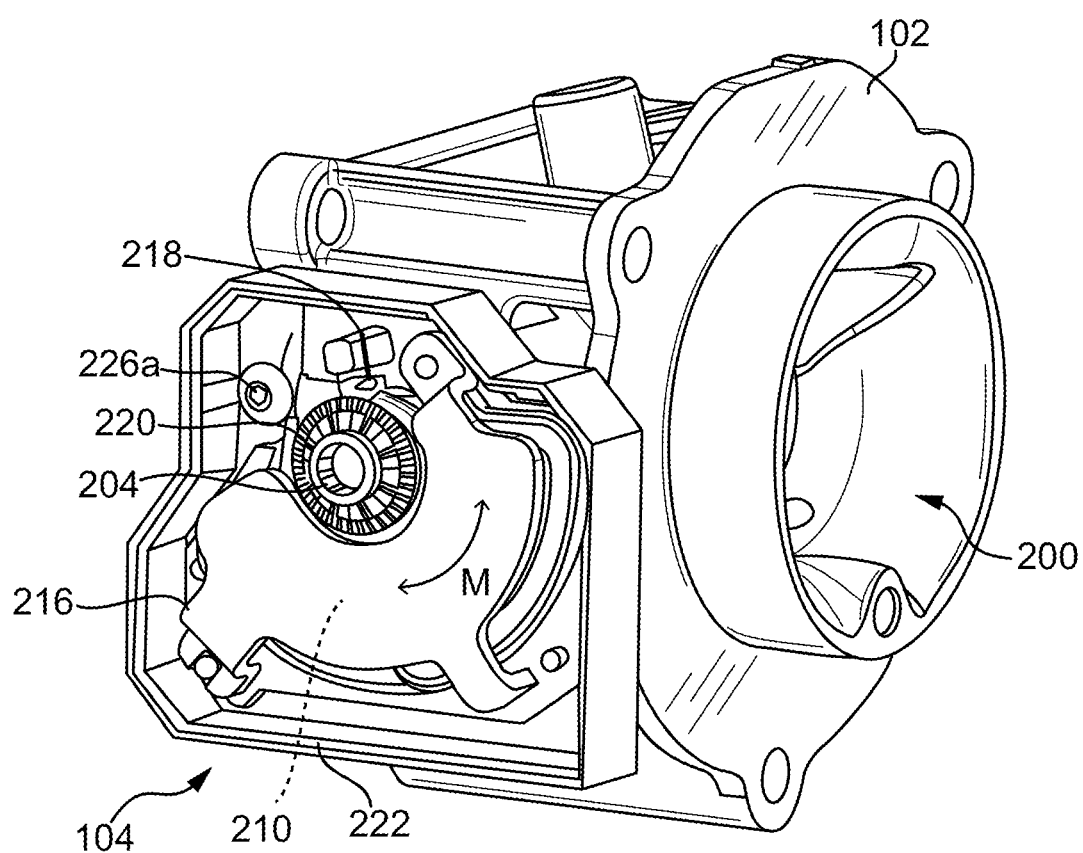
FIG. 3 is a schematic of the drive actuator of FIG. 2 assembled with the throttle body.

FIG. 3 is a schematic of the throttle drive actuator 104 assembled with the throttle body 102. When assembled the drive actuator 104 includes a thin profile, e.g., less than about a third of the width of the throttle body 102, while providing a force sufficient to move the valve 106. For example, with a 1 mS pulse, a peak force of about 13.4 in-lbs can be achieved in less than about 0.7 mS. In some implementations, the drive actuator 104 can rotate the shaft 202 through about at least 75 to 80 degrees of motion in the M directions. The magnets 208 and 210 can be generally arc shaped and sized to provide the 75 to 80 degrees of motion. Other shapes of the magnets and degrees of range of motion can be used, e.g., up to about 180 degrees of motion.

The magnets 208 and 210 can be constructed of one or more pieces. For example, the magnet 208 and/or the magnet 210 can be constructed of two magnets such that the south poles S1 and S2 and the north poles N1 and N2 are separate magnetic pieces. In other implementations the armature 206 may be implemented with one or more magnets instead of windings around a core. A return spring 218 biases the armature 206 in a de-energized position. A spring retaining clip 220 or other fastener holds the spring 218 so that the spring 218 can provide force to maintain the armature 206 in the determined position, e.g., to keep the valve 106 closed when no current is applied to the armature 206. Alternatively, in other implementations the spring 218 can keep the valve 106 open when de-energized.

Figure 4:
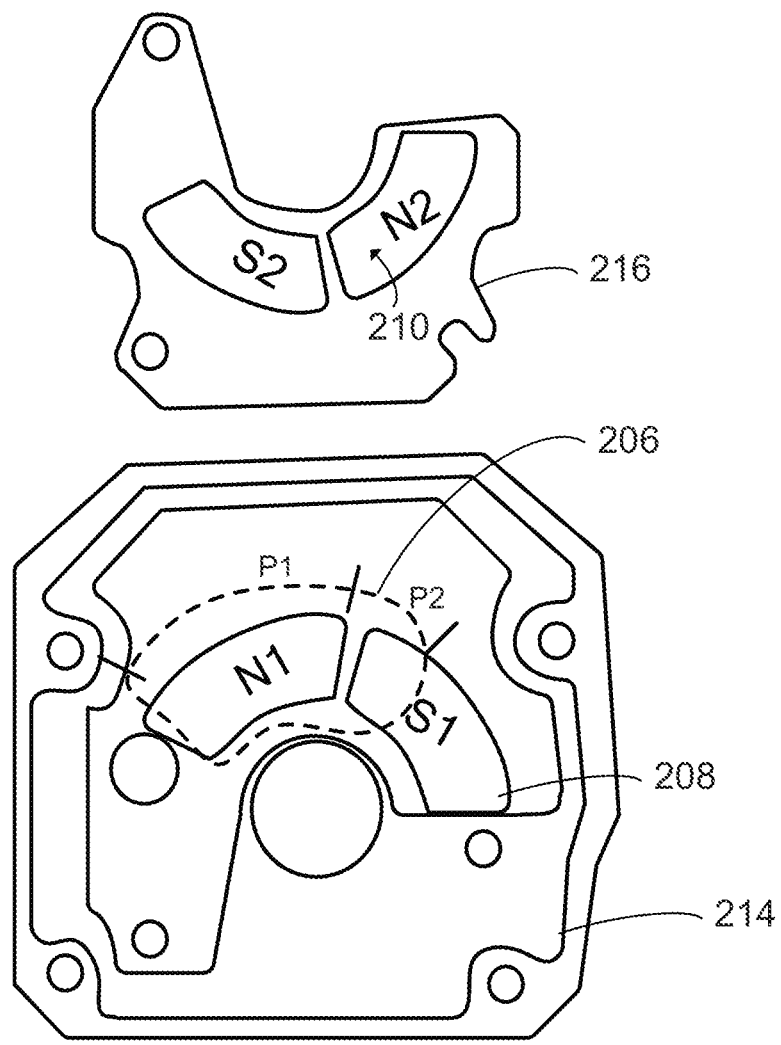
FIG. 4 is a schematic of an example arrangement of the magnet and the magnet.

FIG. 4 is a schematic of an example arrangement of the magnets 208 and 210. When assembled, the orientation of the plate 216 is flipped in the direction of top to bottom so that the south pole S2 of magnet 210 aligns face-to-face with the north pole N1 of magnet 208 to create a magnetic field between the south pole S2 and north pole N1, and the north pole N2 of magnet 210 aligns face-to-face over the south pole S1 of magnet 208 to create a magnetic field between the north pole N2 and the south pole S1, in an opposite direction to the magnetic field created by south pole S2 and north pole N1.

The armature 206 is rotatably positioned between magnet 208 and magnet 210. In a de-energized state a position of the armature 206 is maintained by the return spring 218 so that a major portion P1 of the armature 206 is positioned over north pole N1 and a minor portion P2 of the armature 206 is positioned over the south pole S1. Lorentz force generates the force on the two radial segments P1 and P2 of the coil windings of the armature 206 as current flows. The Lorentz force can include combination of electric and magnetic force on a point charge due to electromagnetic fields. Moving the armature 206 moves the shaft 202 which in turn moves the throttle valve 106, to supply more or less air into the engine 100.

Figure 5:
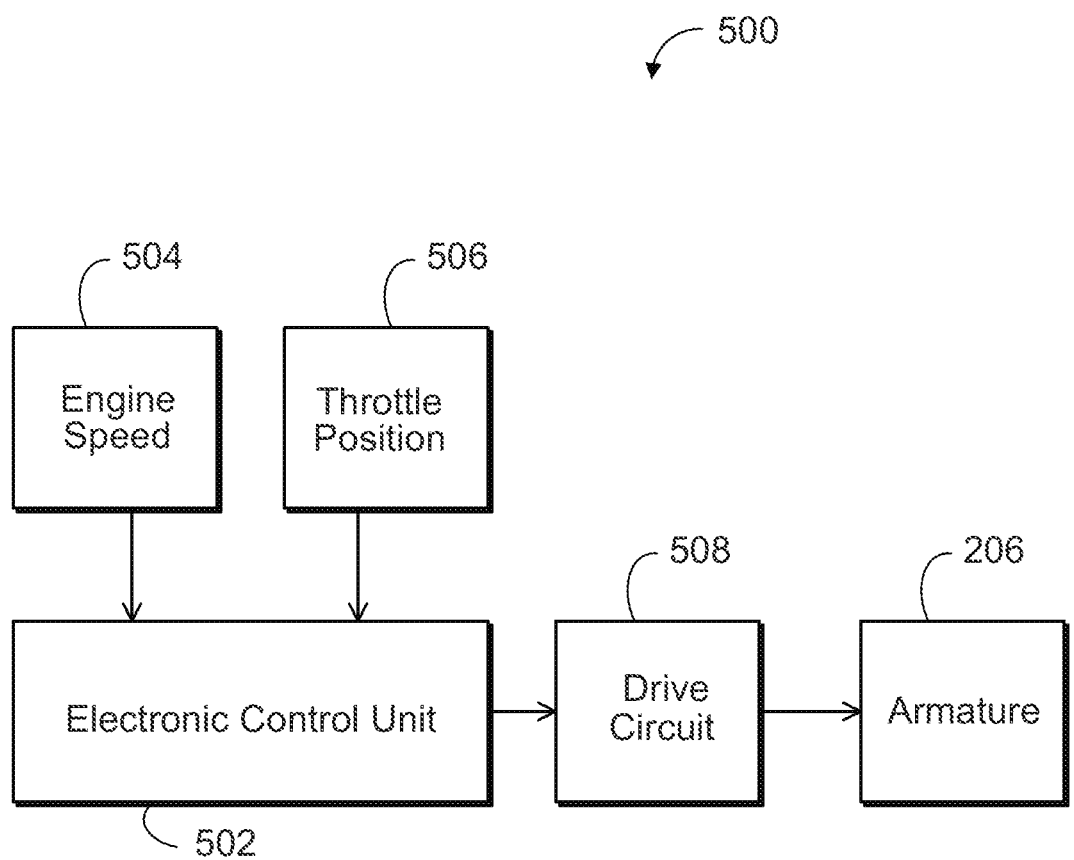
FIG. 5 is a block diagram of an example control system for controlling movement of the valve.

FIG. 5 is a block diagram of an example control system 500 for controlling movement of the valve 106. An electronic control unit 502 receives a signal representing engine requested and actual speed 504 and a signal representing throttle position 506 to control a desired position of the valve 106, e.g., via the armature 206. The electronic control unit 502 can be implemented with one or more control units. The electronic control unit 502 can determine when to send a drive signal to the drive circuit 508 which sends current to the windings of the armature 206 to determine movement of the armature 206. The armature 206 drives the throttle valve 106 to the desired tilt position, e.g., to let more or less air into the engine 100 based on the engine speed 504, throttle position 506, etc. In some examples, the electronic control unit 502 includes a processor and a memory. The memory can store instructions which when executed by the processor perform the functions described herein, e.g., based on the engine speed 504, throttle position 506, etc.

When the air passage 200 is closed by the valve 106, which is placed under the influence of the spring 218, a fixed low amount of air is admitted through the passage 200. The electronic control unit 502 feeds the drive signal to the drive circuit 508 and the drive circuit 508 energizes the coil windings of the armature 206 to produce torque, e.g., in the manner as described above. The magnets 208 and 210 create magnetic fields that cause the armature 206 to rotate the desired amount while overcoming the action of the return spring 218, to cause the throttle valve 106 to turn with the result that the air passage 200 is opened accordingly. When it becomes desired to throttle off the air passage 200, the electronic control circuit 502 sends a signal to de-energize the armature coils. Consequently, the throttle valve 106 is tilted back to its original throttling position by the return spring 218.

In some implementations, a tilt detector may be used, e.g., a potentiometer, tachogenerator, encoder or any other suitable means, which is adapted to produce and transmit a signal to the electronic control circuit 502 representing the degree of tilt of the throttle valve 106 then positioned, or the current opening of the air passage 200.

Figure 6:
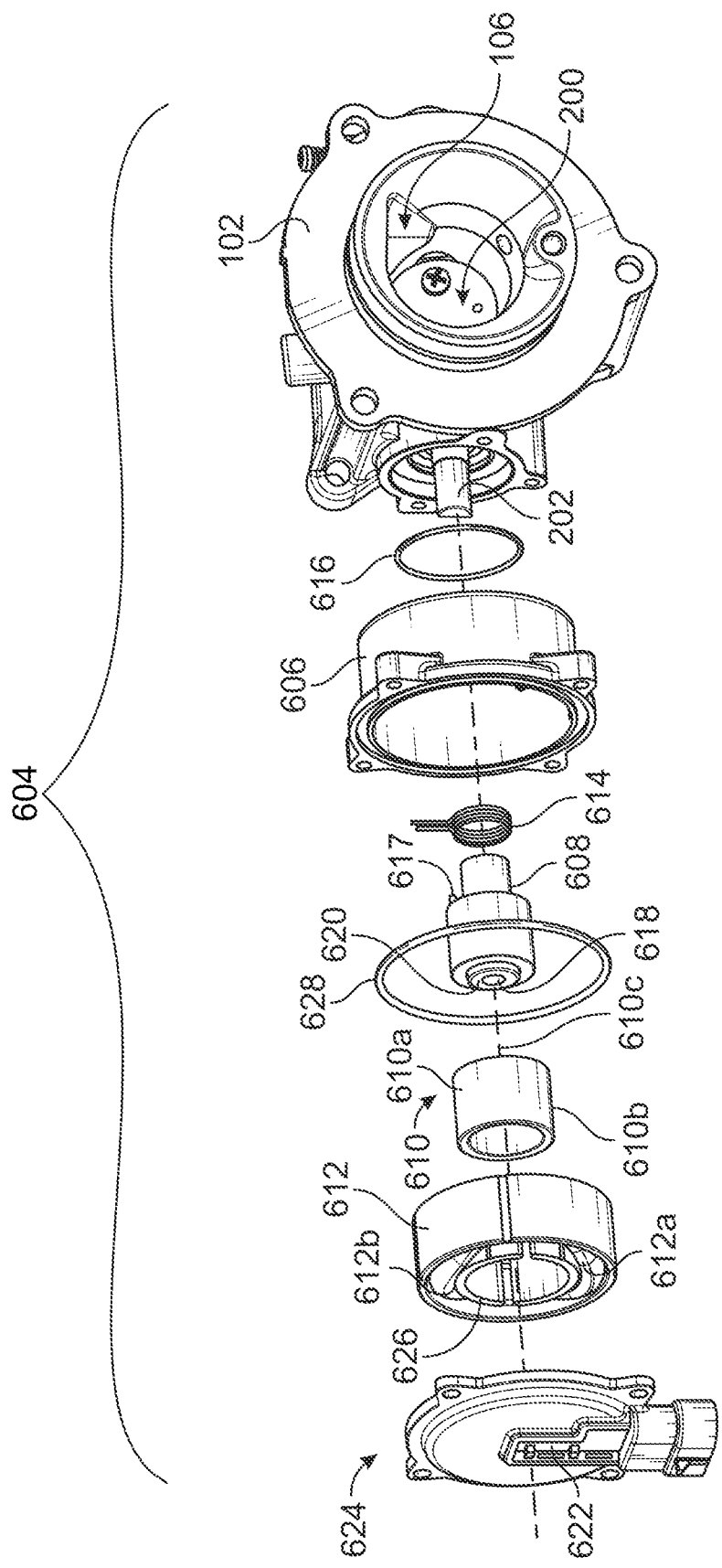
FIG. 6 is an exploded view of an example drive actuator that connects with the throttle body.

FIG. 6 is an exploded view of an example drive actuator 604 that connects with the throttle body 102. In operation, the throttle valve 106 is driven to rotate by the drive actuator 604 by way of the shaft 202. In some examples, the shaft 202 adjusts the tilt of the throttle valve 106 for adjusting the opening of the air passage 200, hence the flow of air passing there through. Other types of throttle valves can be used. A main actuator housing 606 attaches with the throttle body 102 to house a rotor hub 608, a magnet 610, a stator 612 and a return spring 614. In some examples, the main actuator housing is integrated into the throttle body 102. A seal 616 can be positioned between the main actuator housing 606 and throttle valve 106, e.g. to prevent water and/or debris from entering the main actuator housing 606.

The rotor hub 608 can mechanically connect with the shaft 202 to rotate the shaft 202 to open and close the throttle valve 106. The rotor hub 608 can include a pin 617 which engages the spring 614 to return the rotor hub 608 to a neutral position when the drive actuator 604 is not powered, e.g., so that the throttle valve is biased in a determined position, e.g., a closed or slightly open position. Additionally or alternatively, the spring 614 can provide the some or all of the functions of the spring 218 described above. The throttle valve 106 can be closed when the rotor hub 608 is positioned in the neutral position. The magnet 610 e.g., a permanent magnet and/or wire windings with electrical current applied, is assembled to the rotor hub 608, e.g., in some examples bonded with epoxy to the rotor hub 608. In some examples the magnet 610 is integrated with the rotor hub 608. The magnet 610 includes a north pole 610a and a south pole 610b about an axis 610c of the magnet 610. In some examples, the north pole 610a and the south pole 610b can be charged radially about the axis 610c. In some examples, the magnet 610 is cylindrical shaped with a hollow center to fit over the rotor hub 608. Other shapes can be used.

In some example, the rotor hub 608 can also include a throttle position magnet 618 and accompanying carrier 620 connected with the rotor hub 608, in which a magnetic field of the throttle position magnet 618 is sensed by a position sensor 622, e.g., positioned on a cover housing 624 of the drive actuator 604. In some examples, the position sensor 622 is positioned in a cavity of the cover housing 624. In some examples, the position sensor 622 can detect the magnetic field from the magnet 610 to determine position, and not require the throttle position magnet 618 and carrier 620. An O-ring 628, or other sealing mechanism posited between the cover housing 624 and the main actuator housing 606 can prevent water and/or debris from entering the main actuator housing 606. When assembled, a width of the main actuator housing 606 and the cover housing 624 is less than one-third a width of the throttle body. The position sensor 622 can send determined signals to the electronic control unit 502, or other control unit, which represent a current position of the rotor hub 608, e.g., relative to the resting position. The electronic control unit 502 can adjust a position of the rotor hub 608 based on a determined need for more or less air to allow to flow through the throttle body 102 to feed the engine 100.

The stator 612 can include a first pole 612a and a second pole 612b that can be switched to north and south magnetic fields. In some examples the first pole 612a and the second pole 612b are implemented with copper or other types of wire windings. Other materials can be used for the windings. The rotor hub 608 can rotate within a stator pole shoe/saddle 626 of the stator 612. The magnetic field generated by the north pole 610a and the south pole 610b of the magnet 610 interacts with the magnetic fields generated by the stator 612. In some examples, the windings are configured so that a current though the windings cause the first pole 612a to become temporarily magnetized as a north pole and the second pole 612b to become temporarily magnetized as a south pole, or vice versa. A direction of current through the windings can dictate a direction that the rotor hub 608 rotates. The first pole 612a and the second pole 612b can include wire leads to connect with the electronic control unit 502, or other control unit, to control the current sent to the windings. While two poles are described for the magnet 610 and the stator 612, in some examples the magnet 610 and/or the stator 612 include one or more poles.

Figure 7:
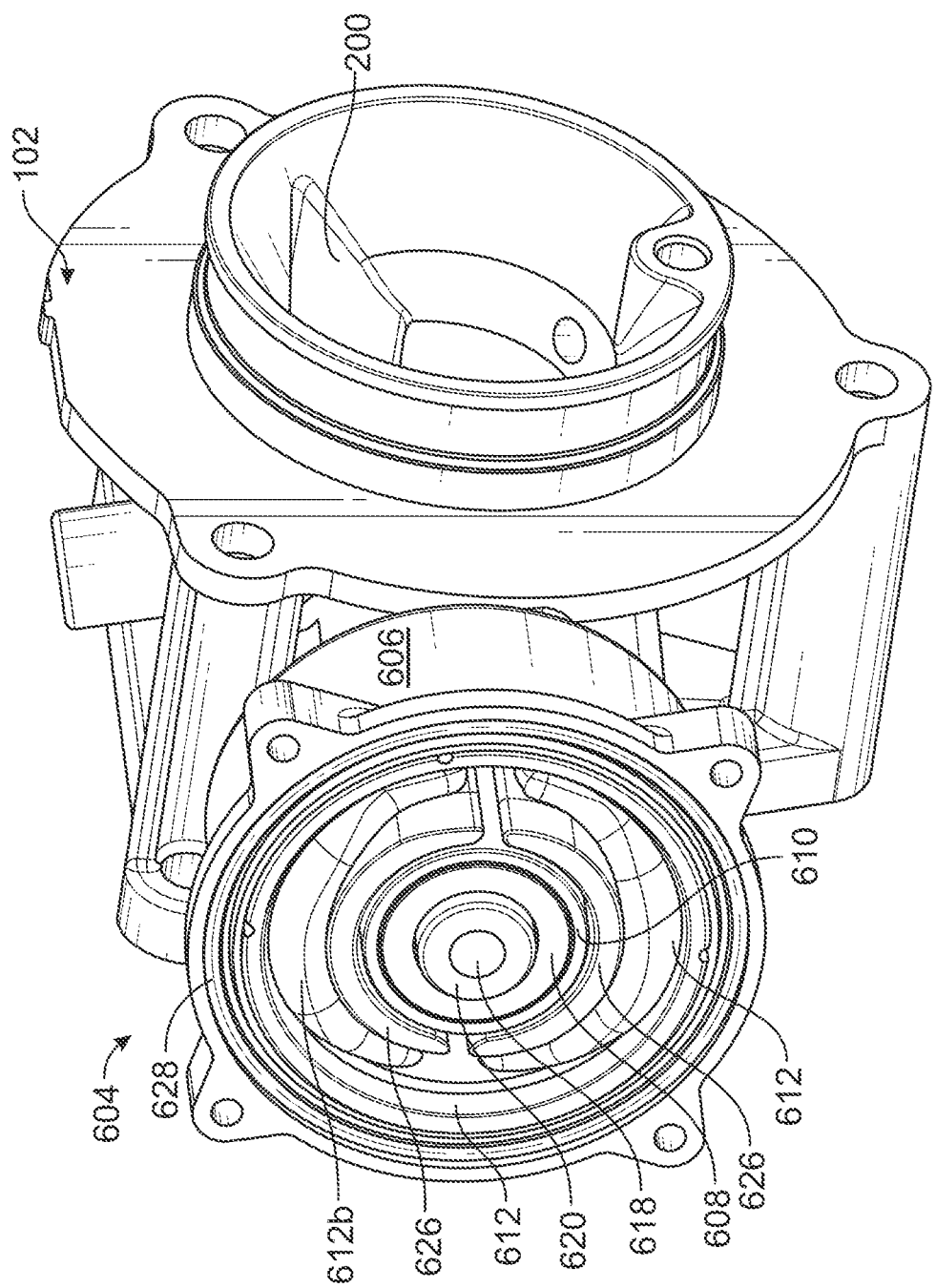
FIG. 7 is a schematic of the drive actuator of FIG. 6 assembled with the throttle body.

FIG. 7 is a schematic of the drive actuator 604 of FIG. 6 assembled with the throttle body 102 of the engine 100. In some examples, the stator 612 is switchably controlled to provide a magnetic field to rotate rotor hub 608 which is mechanically connected with a valve 106 of a throttle body 102, to open a close the air passage 200 of the throttle body 102.

While particular embodiments are illustrated in and described with respect to the drawings, it is envisioned that those skilled in the art may devise various modifications without departing from the spirit and scope of the appended claims. It will therefore be appreciated that the scope of the disclosure and the appended claims is not limited to the specific embodiments illustrated in and discussed with respect to the drawings and that modifications and other embodiments are intended to be included within the scope of the disclosure and appended drawings. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure and the appended claims.

Many modifications and other embodiments set forth herein will come to mind to one skilled in the art having the benefit of the teachings presented in the foregoing descriptions and the associated drawings. Although specific terms are employed herein, they are used in a generic and descriptive sense only and not for purposes of limitation.

We claim:

1. A method of operating an engine with a throttle drive actuator, the method comprising:

biasing a throttle valve of a throttle body into a first position with a biasing member attached to a throttle shaft, the throttle shaft coupled to the throttle valve and the biasing member operatively connected to the throttle shaft;

providing a first magnetic field via a first field source, a second magnetic field via a second field source, and an armature located between the first field source and the second field source, the first field source having a first north pole and a first south pole, the second field source having a second north pole and a second south pole, the second south pole positioned opposite the first north pole and the second north pole positioned opposite the first south pole such that a direction of the second magnetic field is opposite a direction of the first magnetic field, the armature comprising a coupler connected to the throttle shaft and a winding movable along an arcuate path intermediate the first field source and the second field source, the winding comprising an arcuate projection extending to one side of the coupler without extending to an opposite side of the coupler; and energizing the winding of the armature to cause the armature to rotate along the arcuate path, wherein the rotation of the armature causes the throttle shaft to rotate, thereby causing the throttle valve to move into a second position to open or close an air passage of the throttle body.

2. The method of claim 1, wherein the biasing member comprises a spring.

3. The method of claim 1, wherein in the first position the throttle valve closes the air passage of the throttle body, and in the second position the throttle valve opens the air passage of the throttle body.

4. The method of claim 1, further comprising a housing, the housing comprising at least a first housing portion and an opposing second housing portion, the first housing portion coupled to the throttle body and configured to house the first field source, the second field source, and the armature.

5. The method of claim 1, further comprising an electronic control unit receiving at least one signal to control a desired position of the throttle valve.

6. The method of claim 1, further comprising an electronic control unit controlling energization of the winding of the armature.

7. The method of claim 6, wherein the electronic control unit receives signals representing engine requested speed, engine actual speed, and throttle position.

8. The method of claim 7, wherein the electronic control unit controls the energization of the winding of the armature to control the positioning of the throttle valve based on the received signals.

9. The method of claim 1, wherein the armature is configured to rotate at least 75 degrees.

10. The method of claim 1, wherein the armature is configured to rotate less than 360 degrees.

11. A method of operating an engine with a throttle drive actuator, the method comprising:
biasing a throttle valve of a throttle body into a first position with a spring directly attached to a throttle shaft operatively connected with the throttle body; and
selectively energizing a winding of an armature by an electronic control unit and causing the armature to rotate, the armature located between first and second magnets, the first magnet including a first north pole and a first south pole, the second magnet including a second north pole and a second south pole, wherein the first magnet and the second magnet are positioned such that the second south pole is positioned opposite the first north pole and such that the second north pole is positioned opposite the first south pole,
wherein the armature comprises a coupler connected to the throttle shaft, and the winding comprises an arcuate projection extending to one side of the coupler without extending to an opposite side of the coupler, the rotation of the armature along an arcuate path causing the throttle shaft to rotate, thereby causing the throttle valve to move into a second position to open or close an air passage of the throttle body.

12. The method of claim 11, wherein in the first position the throttle valve closes the air passage of the throttle body, and in the second position the throttle valve opens the air passage of the throttle body.

13. The method of claim 11, wherein the first and second magnets have an arcuate shape.

14. The method of claim 11, wherein the armature is configured to rotate less than 360 degrees.

15. The method of claim 1, wherein the first field source comprises a first permanent magnet, wherein the first permanent magnet comprises an arcuate shape including two first ends, wherein the first north pole is adjacent one of the first ends and the first south pole is adjacent the other first end.

16. The method of claim 15, wherein the second field source comprises a second permanent magnet, wherein the second permanent magnet comprises an arcuate shape including two second ends, wherein the second north pole is adjacent one of the second ends and the second south pole is adjacent the other second end.

17. The method of claim 11, wherein the first magnet comprises a first permanent magnet, wherein the first permanent magnet comprises an arcuate shape including two first ends, wherein the first north pole is adjacent one of the first ends and the first south pole is adjacent the other first end.

18. The method of claim 17, wherein the second magnet comprises a second permanent magnet, wherein the second permanent magnet comprises an arcuate shape including two second ends, wherein the second north pole is adjacent one of the second ends and the second south pole is adjacent the other second end.

* * * * *